US012764037B2

(12) United States Patent
Kedia et al.

(10) Patent No.: US 12,764,037 B2
(45) Date of Patent: Oct. 13, 2026

(54) SYSTEMS AND METHODS FOR USING CLIENT SYSTEM INTELLIGENCE FOR DISTRIBUTED SERVICE SYSTEM CONFIGURATION

(71) Applicant: STRIPE, LLC, South San Francisco, CA (US)

(72) Inventors: Gautam Kedia, San Mateo, CA (US); Efstathios Vafeias, San Francisco, CA (US); Jonathon Daniel Brown, Louisville, CO (US); Samuel Ishmael Gehman, New York, NY (US); Jermsak Jermsurawong, New York, NY (US)

(73) Assignee: STRIPE, LLC, South San Francisco, CA (US)

( * ) Notice: Subject to any disclaimer, the term of this patent is extended or adjusted under 35 U.S.C. 154(b) by 96 days.

(21) Appl. No.: 18/987,572

(22) Filed: Dec. 19, 2024

(65) Prior Publication Data

US 2026/0163813 A1 Jun. 11, 2026

(51) Int. Cl.
*H04L 41/16* (2022.01)
*G06F 16/14* (2019.01)

(52) U.S. Cl.
CPC ............ *H04L 41/16* (2013.01); *G06F 16/148* (2019.01)

(58) Field of Classification Search
CPC ............................... H04L 41/16; G06F 16/148
See application file for complete search history.

(56) References Cited

U.S. PATENT DOCUMENTS

2025/0016183 A1* 1/2025 Sergeev .............. H04L 63/1441
2025/0200253 A1* 6/2025 Roper, Jr. ................. G06F 8/71
2025/0225572 A1* 7/2025 Chiu ........................ G06F 40/35
2025/0265347 A1* 8/2025 Gasser .................. G06F 21/577
2025/0272636 A1* 8/2025 Wright ............. G06Q 10/06316
2025/0285043 A1* 9/2025 Beagle ..................... G06F 40/40
2025/0384508 A1* 12/2025 Toor ........................ G06Q 50/26
2026/0134041 A1* 5/2026 Wong ...................... G06F 16/93

* cited by examiner

*Primary Examiner* — Benjamin M Thieu
(74) *Attorney, Agent, or Firm* — FINNEGAN, HENDERSON, FARABOW, GARRETT & DUNNER, LLP

(57) ABSTRACT

A method and apparatus for executing a service of a server computer system for a client system are described. The method may include defining a client system descriptor file that includes a set of signals suitable for input into a large language machine learning model (LLM), and collecting data associated with a first client system that is representative of the set of signals. The data can then be compressed into the set of signals for a first client system descriptor file allocated for the client system. A query is executed using at least the first client system descriptor file as input into the LLM, and in response to an output obtained by the LLM, at least an action is executed by the service of the server computer system.

20 Claims, 7 Drawing Sheets

302

Client Details:
Business DBA: ABC Corp******
Business URL: Abc-corp******.com
Product Description: Clothes , shoes , hats
Owner Details:
Owner Email: ******@address.com
Client Contact Email: ******@address.com
First IP address: 123.45.******
Address: San Francisco CA 94016 US
Representative Name: Jane******
Primary User Email: jdoe******@address.com
Website Details:
0 Skip to Content Services Overview Individuals Service Providing Groups + Teams FAQs About Services Provided with John Doe Open Menu Close Menu Services Overview Individuals In Service Groups + Teams FAQs About Services Provided with Wes Mont Open Menu Close Menu Folder: Services FAQs About Contact With John Doe or Wes Mont Overview Individuals Corporate Groups + Teams Discover the depth of services offered. Develop proven Techniques to determine relevant services, configure services for end uses, and provision service systems to provide the services. You will receive a Summary that can be referenced during use. Mentors with certifications can work with team members to configure service deployments and/or service packages. Continued analysis of ...

FIG. 3A

LLM_response 352

<explanation> Based on the information provided in the summary, this client system appears to be fraudulent. The key points that indicate this are:

1. Rapid creation of products/prices/links: The summary shows a high frequency of account updates, customer creations, and payment intent creations in a short duration of time, suggesting the client system is quickly creating new products, prices, an payment links.

2. Mismatches between address countries: The client system's profile lists the address as being in Malaysia, but the customer orders are shipped to various countries like the US, Spain, and Ireland, indicating a mismatch.

3. Unusual client system descriptions: The client description is provided in a very generic, simply stating they are an "online clothes selling company", which is a common tactic used by perpetrators of fraud.

4. Emails and URLs that don't match each other or owner's names: The owner email, business email, and business URL do not match raising suspicions.

5. Scammy websites that sell too many different things have too many discounts; The client system website appears to sell a wide variety of clothing products with many discounts, which is a common characteristic of fraudulent client system websites.

Overall, the rapid changes to the account, mismatched addresses, generic descriptions, and suspicious website details suggest that this client system is likely engaing in fraudulent activities. </explanation>

This merchant is: <answer> fraudulent </answer>

FIG. 3B

SYSTEMS AND METHODS FOR USING CLIENT SYSTEM INTELLIGENCE FOR DISTRIBUTED SERVICE SYSTEM CONFIGURATION

CROSS-REFERENCE TO RELATED APPLICATIONS

This application claims priority to Greek Patent Application No. 000005792, filed on Dec. 11, 2024, which is hereby incorporated by reference in its entirety.

BACKGROUND

Server computer systems provide remote services to client systems over a network, such as the internet, a local network, a telecommunications network, or a combination of various network types that enable communication between remotely located systems. The services can include, for example, fraud detection, performing an action requested by a first computing system with another remotely located computing system, storing and/or transferring data, as well as a number of other services that may be remotely provided by the server computer systems. Such server computer systems typically offer multiple services for the clients of the server computer system, and such systems that use the services of the server computer systems are referred to as client systems.

The client systems that utilize the remote computing services provided by the server computer system, however, vary greatly from one another in terms of how they use the services, which services they use, the volume of services used, etc. For example, client systems that utilize the services provided by a server computer system may include a single client system associated with a single user, a plurality of client systems associated with large corporations, client systems located in different geographical regions, client systems that attempt to perform legitimate actions using the server computer systems, client systems that are only established for the purpose of attempting to perpetrate fraud using through the services of the server computer systems, etc. Thus, the services, and their respective operational configurations, that are provided to each of the client systems may also vary greatly including how the services are configured by the server computer system for each client to best respond to the needs of each client system, as well as whether one or more services should be provided at all to one or more client systems. Thus, a technical challenge exists where client system requests may be received by the server computer system, and a decision of how to respond to that request, whether to process the request, how to configure a service to execute the request, etc. may be based on limited information about the client system. The fact that such requests may be received as application programming interface (API) based messages that give a remotely located client system the opportunity to obfuscate their motives exacerbates this problem.

Additionally, server computer systems that provide various remote services to a variety of client systems typically operate at scale. That is, the server computer system may serve a very large number of client systems. A subset of those client systems may also make a large number of service requests per minute, hour, day, etc. Thus, the scale of data and requests handled by the server system to respond and provide the requested services consume a vast amount of computational and memory resources. Thus, another technical challenge to be addressed is for systems to determine how best to configure services and/or respond to client systems request in compute and/or memory efficient ways.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 3A is a block diagram of one embodiment of a client system descriptor file used as input to a large language learning model (LLM) of the client system intelligence system.

FIG. 3B is a block diagram of one embodiment of a query response generated by the LLM of the client system intelligence system.

DETAILED DESCRIPTION

Figure 1:
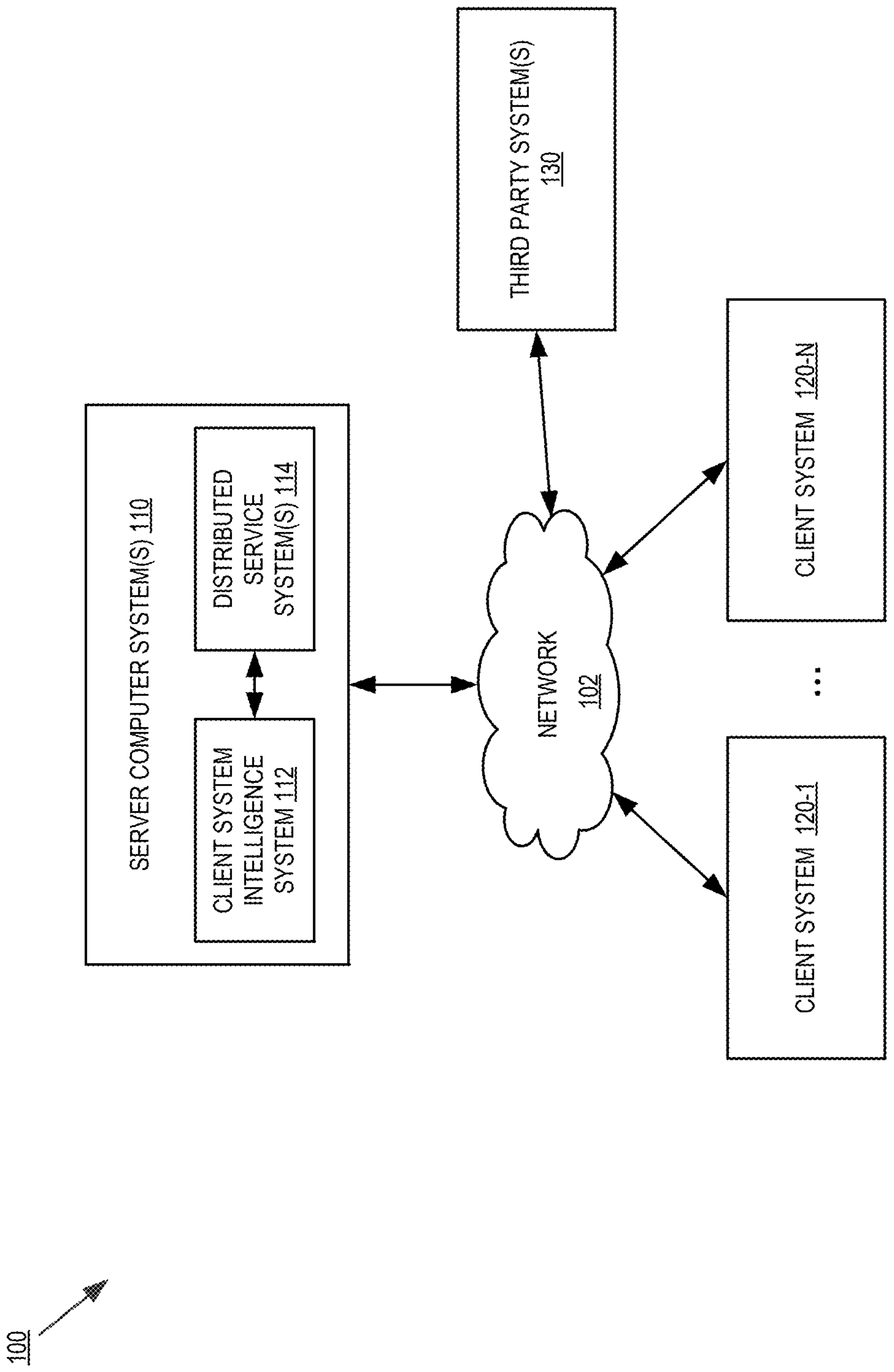
FIG. 1 is a block diagram of an exemplary system architecture for a server computer system that provides distributed services to client systems using a client system intelligence system.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "defining", "collecting", "compressing", "executing", "performing", "receiving", "initiating", "extracting", "storing", "updating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for a server computer system 110 that provides distributed services to client systems using a client system intelligence system 112.

In one embodiment, the system 100 includes server computer system(s) 110, a plurality of client systems (e.g., client system 120-1 through client system 120-N, sometimes referred to herein as client systems 120), and third party system(s) 130. In one embodiment, one or more systems (e.g., systems 120 and/or 130) may be mobile computing devices, such as a smartphone, tablet computer, smartwatch, etc., as well computer systems, such as a desktop computer system, laptop computer system, server computer systems, etc. The server computer system(s) 110, client systems 120, and third party system(s) 130 may also be one or more computing devices, such as one or more server computer systems, desktop computer systems, etc. Furthermore, there may be any number of client systems utilizing the distributed service system(s) 114 of the server computer system(s) 110, consistent with the discussion herein.

Furthermore, it should be appreciated that the embodiments discussed herein may be utilized by a plurality of different types of server computer systems. For example, such server computer systems can provide data storage services, multimedia portal services, gaming services, real time image and video systems, card authorization systems, as well as other types of systems in which client system intelligence may be used to determine whether or not to provide services to a client system and/or how to most appropriately configure the distributed service system(s) when providing service(s) to the client system.

The server computer system(s) 110, client systems 120, and third party system(s) 130 may be coupled to a network 102 and communicate with one another using any of the standard protocols for the exchange of information, including secure communication protocols. In one embodiment, one or more of the server computer system(s) 110, client systems 120, and third party system(s) 130 may run on one Local Area Network (LAN) and may be incorporated into the same physical or logical system, or different physical or logical systems. Alternatively, the server computer system (s) 110, client systems 120, and third party system(s) 130 may reside on different LANs, wide area networks, cellular telephone networks, etc. that may be coupled together via the Internet but separated by firewalls, routers, and/or other network devices. In one embodiment, server computer system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In embodiments discussed herein, server computer system (s) 110 provide services to client systems 120 via network 102. The services are provided from a set of distributed service systems 110, which are computationally distributed and/or physically distributed between different hardware systems of the server computer system(s) 110. The services can include, for example, onboarding services to collect information from a new client system, data distribution services for storing, moving, consolidating, etc. client system data, facilitating interactions between a client system (e.g., client system 120-1) and a user of the client system, fraud detection that may be perpetrated by client system requests or client system user actions, planning systems that enable server computer system 110 to provide planning of resources used by the client systems 120, etc., as well as a combination of such services that can be provided remotely over network 102.

In some embodiments, each of the aforementioned distributed service system(s) 114 can be selected for use (or selected to deny use), and operational characteristics configured for the needs of a specific client system (e.g., based on a client system characteristic, such as geography, expected processing load the client system will user, which services are requested by the client system such as fraud analysis, etc.). Furthermore, other services of the distributed service system(s) 114 that are not specifically requested for use by a client system 120 may also be used to support the client system's requests, such as one or more distributed service systems(s) 114 that support the operations of other distributed service(s). In an example, an onboarding service system may use a fraud detection service system to determine if a client system seeking to be onboarded to the service computer system 110 is fraudulent and/or if a service request is made for fraudulent purposes. Furthermore, services requested by a client system 120 may indicate that the client system 120 may be a good candidate for one or more other services, which can be recommended to the client system 120.

In some embodiments, the types of client system 120 may vary greatly, such as single user client systems to client systems that support a large corporation having a plurality of users. As another example, a client system 120 may provide a product or service to its end users, and the number of these end users can vary from client system to client system. These different client systems therefore have different needs and usage scenarios of the distributed service systems 114. Therefore, determining how to best respond to client system needs, such as how to configure distributed service systems 114, how to select and or deny access to services of specific distribute service systems 114, and how to make such decisions becomes increasingly complex given the number of client system variations and the number of different, and potentially interactive, distributed service system(s) 114. Furthermore, the volume of client systems 120 and the volume of service requests that each client system may make to the distributed service systems 114 of the server computer system 110 exacerbates the above decisions by putting increased pressure on the computational and memory loads of the resources of the server computer system 110.

In some embodiments, server computer system(s) 110 therefore includes a client system intelligence system 112 that enables server computer system(s) 110 to determine how to respond to client system requests, what service to suggest to client system, and how to configure those service systems 114. Furthermore, and as discussed in greater detail herein, the embodiments employed by the client system intelligence system 112 are both compute and memory sensitive to address technical challenges at the scale of client systems and client system requests that may be processed by the server computer systems 110 on a minute, hourly, daily, etc. basis.

In some embodiments, client system intelligence system 112 utilizes a machine learning model based approach to determine how to best respond to the requests of client systems 120, and how to configure, select, and/or recommend which services can be provided to a specific client system 120. In some embodiments, the machine learning model based approach deployed by client system intelligence system 112 uses a trained large language model (LLM) to take as input a set of the client system's information, one or more queries, and then generates responses to the one or more queries associated with the client system. The training, usage, and refinement of the LLM used by the client system intelligence system 112 is discussed in greater detail below.

The client system's information, used as input to the LLM, includes a set of identification information to differentiate among differentiate client systems, and a set of machine learning model input signals (i.e., signals for short). The client system intelligence system 112 therefore allocates, for each client system of the server computer system 110, a client system descriptor file that defines the types of identification data for identification of a client system and the set of signals. For example, the client system descriptor file may be a text file, html file, XML file, a multimodal file, or other file types that defines the values and their formatting within the client system descriptor file.

The client system descriptor file forms an input that is suitable for ingestion by the LLM and use by the client system intelligence system 112. Example fields of the client system descriptor file include (1) identification as to who the client system is, such as a name, numerical identifier, etc.; (2) names or identifiers of key users of the client system (e.g., officers and/or owners of a client); (3) how many services or service operations a client system requests over a period of time (e.g., as determined through a periodic client system data collection process, discussed herein); (4) tenure of a client system with the server computer system 110 (e.g., a period of time that corresponds to how long the client system has used the server computer system 110; (4) average of data characteristics submitted/processed by service request, such as amounts, sizes, times, etc. associated with service system requests; (5) whether the client system is the subject to disputes submitted by or against its end users; (6) whether periodic client system data collection processes detect changes in key users or other significant information that is expected to remain relatively static; (7) time data associated with service system requests; (8) web page descriptions collected from a remote system; as well as other potential signals that may be useful for the LLM in answering queries relevant to service system 114 configuration and usage, as discussed herein. In some embodiments, the client system descriptor file is a selective representation of information relevant to a client system, and not an exhaustive representation of all possible client system information.

An exemplary embodiment of a client descriptor file 302 is illustrated in FIG. 3A. The client system descriptor file 302 is a structured text file that includes client system details including a client system name, an entity name of the client system, a URL of the client system's website, a description of products or services that this client system might sell. The illustrated client descriptor file 302 may further include owner details, which are signals indicative of key client system users, and can include owner email addresses, contact information, address, etc. Additionally, in some embodiments, a website description may be obtained for the website referenced in the URL of the client details section of the client system descriptor file, such as accessing and parsing information from the website, requesting the LLM to summarize the website's content, etc. Other fields and signals may be defined and included within a client system descriptor file, consistent with the discussion herein. In embodiments, such a client system descriptor file is therefore an aggregation of information about a client system that is collected from a plurality of different sources. Having the client system descriptor file organized, stored, and accessible in a single location reduces time and compute resources that would otherwise be expended if client system descriptions were generated on the fly for individual operations. Furthermore, systems and operations that use and analyze the information within the client system descriptor file(s), such as the LLM analysis discussed herein, are able to complete their operation in a more efficient manner.

Returning to FIG. 1, in some embodiments, client system intelligence system 112 performs a periodic client system data collection process to collect and update the signals and data within each client system descriptor file. A set of data collectors are therefore periodically executed to obtain data from the client systems (e.g., a web server run by the client system, by issuing requests to the client system such as a location of the client system, names and contact information of key users, etc.), from remote third party systems (e.g., third party database systems that store data relevant to client systems, such as chambers of commerce, public domain data collections, review websites, etc.), and from service system data generated by the distributed service system(s) 114 in response to client system requests (e.g., data of service systems including API requests and response, counts associated with such requests including whether request are denied as fraudulent, disputed, etc., which service systems are used, when, etc.).

In some embodiments, the information collectable about each client system by the client system intelligence system 112 is therefore vast. Therefore, in some embodiments, a set of client system signals is initially defined and collected for each client system's descriptor file, and the set of signals refined over time to change signals to those that are determined to be more relevant when answering queries by the LLM and/or to reduce the set of signals from an initial set to a smaller set of the signal that are the best contributors to answers generated by the LLM. By changing signals, the LLM may therefore become more accurate over time to improve the functioning of the LLM, and thus the service system configuration and functioning for each client by generating more accurate query responses. Furthermore, by reducing the set of signals over time to signals that have a larger contribution or impact to query responses, and eliminating one or more signals that are not impactful contributors to query responses, the size of the client system descriptor files is reduced, which reduces storage requirements for storing the descriptor files, and reduces the computational resources consumed during data collection and during LLM execution. Additionally, reducing the set of signals improves the efficiency of the client system intelligence system 112 by reducing response time as a result of the LLM execution processing few input signals, which introduce less noise into the LLM's analysis. As discussed herein, the server computer system 110 operates at a large scale, and thus these savings in memory and compute resources are significant technical improvements to such service system configuration and recommendation systems.

The LLM of the client system intelligence system 112 may then be queried using the completed client system descriptor files as an input to the LLM along with one or more specific queries. LLMs are trained to recognize words, relationships between words, and then predict outputs based on the words and relationships in the inputs. Furthermore, the LLM is given access to one or more datastores of the server computer system for information relevant to queries. The queries may therefore include, for example, natural language queries that ask "Is the client system associated with fraud?", "Should more information be requested during onboarding?", "Is the client system issuing valid API requests to service system X?", as well as other natural language queries. Other forms of queries that are interpretable by the LLM may also be used in conjunction with the LLM. In some embodiments, the trained LLM uses the signals in the client descriptor file, and the data available to the LLM, to generate answers to the queries. For example, if the query "Is the client system associated with fraud?", the LLM can generate a response including chain of thought reasoning why a client system is, or why the client system is not, associated with fraudulent activity. The LLM can use the client system descriptor file as well as a history of service system requests and interactions to generate query responses.

In some embodiments the queries supplied to the LLM may be a combination of operator defined queries (e.g., submitted via an interface to the client system intelligence system 112). Alternatively, the queries may be a set of predefined queries that are automatically and periodically run using the LLM. Such canned and periodic queries enable the client system intelligence system 112 to periodically detect changing conditions of client systems. Furthermore, operator-defined queries, submitted on the fly, enable human experts to check and/or intervene on client systems on an on-demand basis (e.g., in response to an emerging pattern of behavior of one or more client systems that are identified by a human operator). In some embodiments, any combination of operator defined and/or preconfigured queries can be used by the client system intelligence system 112 consistent with the discussion herein.

FIG. 3B illustrates an exemplary response 352 generated by the LLM. For example, the response may detect and then output that information in a client descriptor file (e.g., client system supplied data and collected data) do not match, a pattern of client system service requests is consistent with nefarious behaviors, identification data such as emails and URLs do not match, a website is similar to other scam websites, etc. Such statements are a chain of thought reasoning generated by the LLM, which is a justification or reasoning for an ultimate query answer. Furthermore, the collection of these reasonings leads the LLM to the final decision that the client system is engaging in fraudulent activity, as illustrated in response 352.

Returning to FIG. 1, client system intelligence system 112 may use the queries to initiate one or more operations and/or configuration changes at the service systems 114. For example, if fraudulent activities are detected as illustrated in the query responses to FIG. 3B, a service system may be configured to require stricter authentication requirements prior to processing a client system request, a service system may be configured to generate a client system request for information (e.g., generate and transmit an electronic communication, interface, etc. requiring an update or reason why information mismatches are found), a service system may be configured to deny service requests while the client system is determined to be fraudulent, as well as other configurations to the operational characteristics of the distributed service system(s) 114. Conversely, if the query responses returned are positive, service systems may be configured to ease authentication requirements, generate notifications offering access to additional service systems (e.g., those not currently used by a client system but used by a relevant cohort of client systems), etc. Other automated and/or remedial actions may be taken in response to the operator defined and/or periodically executed queries.

In the embodiments discussed above, and as will be discussed further below, a client system descriptor file is defined and populated with relevant signals for LLM processing and analysis. The signals in the client descriptor file evolve over time to update and/or reduce the number and signals used in such a way that is both memory and compute efficient. That is, reducing and/or changing the number of signals in a client system descriptor file makes the files smaller, while improved signal selection ensures the LLM query responses are at least as accurate or more accurate. Thus, descriptor file storage is reduced, the LLM processing resources are reduced, client system data collection is simplified, and there is no loss in LLM query response accuracy. At scale, with systems such as the server computer system, this represents a significant saving in resources with no loss in accuracy.

Figure 2:
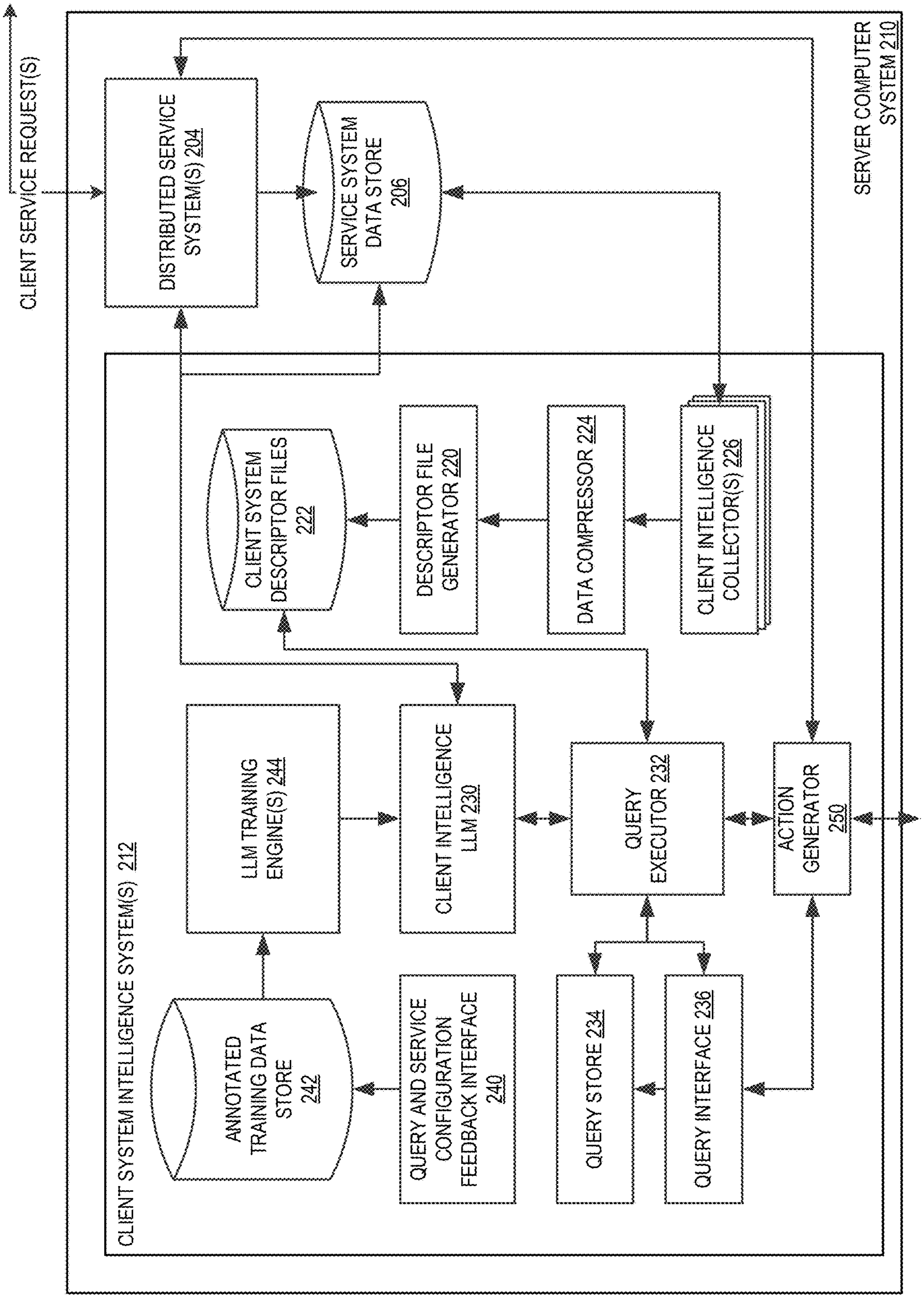
FIG. 2 is a block diagram of one embodiment of a client system intelligence system used by a server computer system.

FIG. 2 is a block diagram of one embodiment of a client system intelligence system 212 used by a server computer system 210. Client system intelligence system 212 and server computer system 210 provides additional details for the client system intelligence system 112 and server computer system(s) 110 discussed above in FIG. 1.

In one embodiment, the client system intelligence system 212 is comprised in the server computer system 210. Server computer system 210 may be a single computer server system, a plurality of interconnected server systems, and/or remotely located server computer systems 210 communicatively coupled via a network (e.g., network 102). Furthermore, client system intelligence system 212 may be an instance of a client system intelligence system, with instances distributed and executed at different server computer systems responsive to load, geographic limitations, compute power available at specific server systems, etc.

Client system intelligence system 212 includes a descriptor file generator 220, a data compressor 224, a plurality of client intelligence collectors 226, and a data store of client system descriptor files 222.

In some embodiments, collectors 226 are configured to access data relevant to signals embedded in client system descriptor files. Therefore, collectors 226 access and/or query a variety of data sources. In some embodiments, collectors 226 may access data generated by service systems (e.g., service system data store 206) to obtain service system data generated by service systems 204 in response to client system service requests. For example, collectors 226 can access data store 206 for onboarding data supplied by a client system, account information associated with an account of a client system, service system request information (types, number, other parties to service system requests, such as users or customer of client system), API events processed by server computer system (e.g., state changes to a client system, account, key people, etc. exchanged between service systems via API based messaging), as well as other data stored by server computer system 110.

In some embodiments, collectors 226 may also obtain and/or access data at third party databases (e.g., public domain databases, governmental databases, etc.), a website of client system (e.g., for corroboration with or supplementation of, client system supplied data), or other remote data sources. In some embodiments, one or more of the collectors 226 may also be trained machine learning models, such as one or more LLM or other ML models trained to extract information from websites (e.g., an LLM trained to summarize website content, extract key customers or client system information from a website's encoding, an ML model of the server computer system 110 such as a fraud model, forecast model, etc.).

The collectors 226 are run to collect client system information for each client on a periodic basis, such as every minute, hour, day, week, or other periodic time interval. Furthermore, the collected client system information may include numerical values (e.g., time, counts, amounts, etc.), text (e.g., names, website descriptions, etc.), summarized information (e.g., website summaries), and other alphanumeric data. In some embodiments, the collectors may further generate or obtain client system information in additional modalities, such as a x-dimensional vector of a high dimensional space that machine learning model collector may generate (e.g., a fraud model, forecast model, or other model may generate as an output a 1×M or N×M dimensional vector representing a decision generated by the model).

The collectors 226 provide the retrieved information to data compressor 224. Data compressor 224 is responsible for transforming the collected corpus of client system data representative of the signals defined by the client system descriptor file into consolidated signal values. In an embodiment, the data compressor 224 generates a representation for the defined signal values by inputting collected data into a function (e.g., sum a count of an API event occurrence, sum a count of fraud or dispute detections, etc.), a heuristic (e.g., if client system is located in country X, apply signal value), a selection mechanism (e.g., from among all service system events, what was the highest requested amount associated with a request), a model output value (e.g., a ML or LLM output of a numerical value, x-dimensional vector or matrix, etc.), as well as other data transformation. In some embodiments, the data transformations convert the collected data into signal values as defined in the client system descriptor files associated with each client system.

In some embodiments, the data compressor 224 may further transform values into binned values for each signal. The binned values represent a grouping or other division of values into a simple numerical value, such as one of a set of integers. For example, a signal for a number of declines detected for service system requests made by a client system may be binned into a one of a set of 3 values. For example, 0 to 10 detected declines over a period of time can be binned to signal value of 0, 11 to 1000 declines binned to a signal value of 1, and >1001 declines binned to a signal value of 3. Binned values enable a reduction in data storage of the client system descriptor files because binned values are simpler data representations and require less memory to store those values (e.g., storing an integer compared to storing text, a floating point number, etc.). Furthermore, in some embodiments, any signal and/or all signals are transformed by data compressors 224 to binned values (e.g., time, counts, text, location, etc. can each be binned to low memory usage numerical values). At scale, given the number of descriptor files stored in data store and processed by description file generator 220, as well as usage of a simple numerical value, the binned values help to reduce memory requirements for client system descriptor file storage, while enabling descriptor file generator 220 to processing resources to generate new and update existing descriptor files.

In either embodiment, descriptor file generator 220 generates new descriptor files for new client systems according to the defined format of the client system descriptor file. If a client system descriptor file exists for a client system, generator 220 can access the file from data store 222, and update signal values generated by data compressor 224. The new and updated client system descriptor files, including the signal values, are stored in client system descriptor files data store 222.

As discussed herein, the processing of data descriptor files by collectors 226, data compressor 224, and descriptor file generator 220 occur on a periodic basis.

Client system intelligence systems 212 further includes client intelligence LLM 230. In some embodiments, and as discussed herein, the LLM 230 is a large language model that is trained to answer natural language or other LLM interpretable queries about client systems within the domain of the server computer system 210. For example, LLM 230 is trained to answer questions, such as "is client system X showing fraudulent behavior?", "should client system X be limited in usage of a service system?", "should a new service be recommended to client system X", as well as other questions relevant to the domain in which the server computer system 210 operates.

In some embodiments, LLM 230 may be a bidirectional encoder representations from transformers (BERT) LLM, a generative pretrained transformer (GPD) LLM, or other form of LLM such as a bidirectional encoder representations from transforms (BERT) LLM or an autoregressive large language model such as Llama. Furthermore, the LLM 230 is trained by LLM training engine(s) 244 in multiple phases to be able to answer queries as discussed herein. In some embodiments, a first phase of unsupervised training is performed in which the LLM 230 is trained to recognize text, numbers, or other characters, and their relationships in an input/query, and then predict an output/response based on these known relationships. In an embodiment, the LLM 230 may be trained in this first unsupervised training phase by LLM training engine(s) 244, or may be pretrained by an organization that generates LLMs for usage by server computer systems, such as server computer system 210.

In either embodiment, before deployment of the LLM 230 to answer queries about client systems, a second training phase is performed in which annotated training data store 242 supplies training data with queries and annotated answers, including the descriptor files or descriptor file identifiers used to generate the annotated answers, to LLM training engine(s) 244. The second phase of the LLM's 230 training is a periodic supervised training phase and enables the LLM to respond to questions within the domain of the server computer system 210. In other words, the language, reasoning, and prediction learned in the first training phase are refined by the supervised training during the second phase. The refinement enables the LLM 230 to answer specific queries related to the domain of the system 210, for example a data distribution domain, a service provider domain, or other domain.

Furthermore, in some embodiments where client system descriptor files are defined using binned values, the binned values reduce the computational complexity of the second training phase, resulting in a faster and more efficient training process due to the decreased complexity of training data input. That is, the binned values can reduce the total number of options of each value (e.g., a time based may be represented by 24 hours, may be represented by 1440 minutes, etc.), whereas a binned version of that time value may be represented by 2 values (e.g., a numeric representation of day and night). As another example, an infinite range of floating point numbers can be binned to a set of simple integer values. Thus, the binned values simply the relationships within the LLM, and their simplified values reduce computational load expended when iteratively performing the second phase training or retraining phases of the LLM 230.

Figure 5:
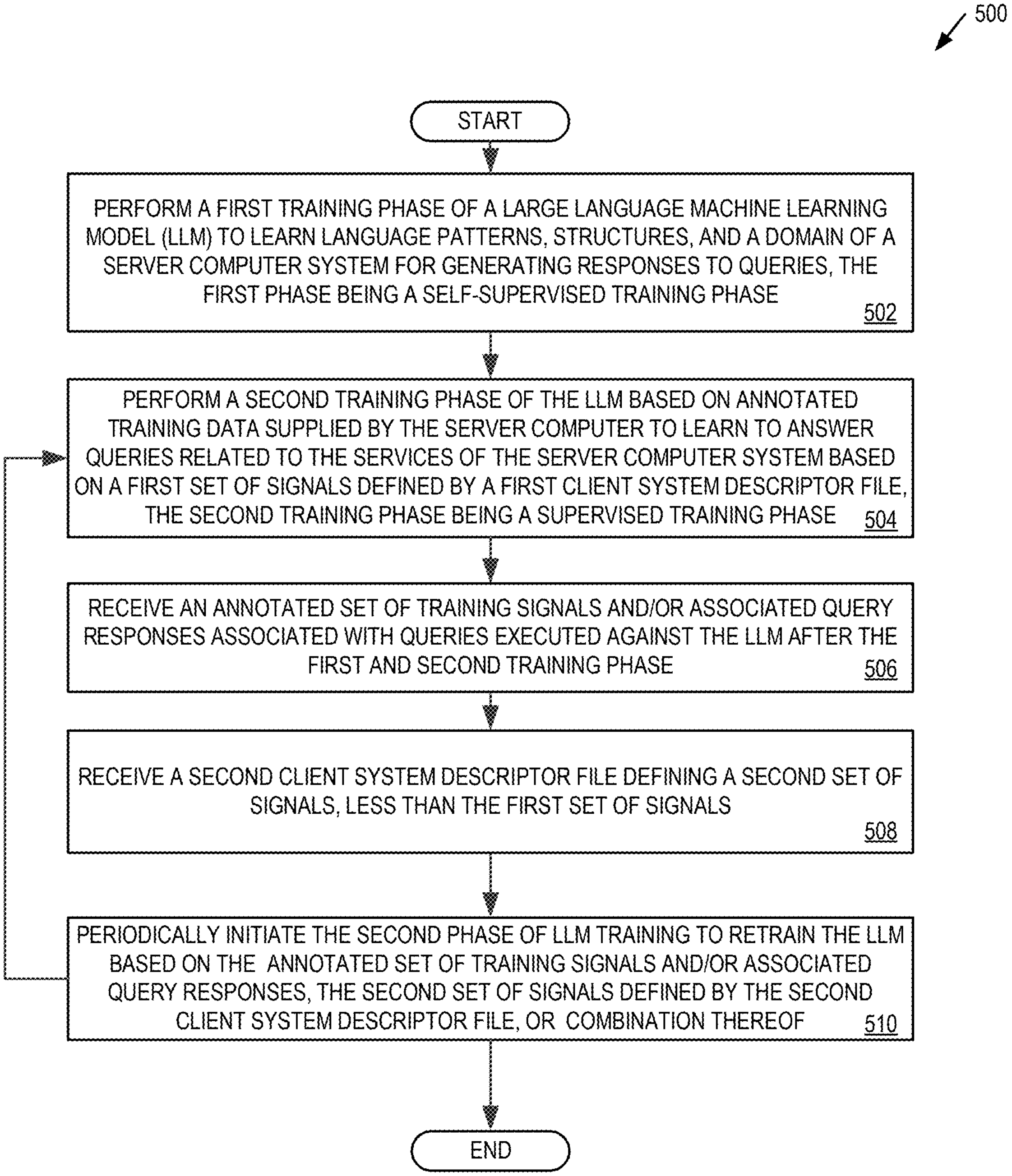
FIG. 5 is a flow diagram of one embodiment of a method for training and retraining process used by a client system intelligence system of a server computer system.

When the second phase training of the LLM 230 is complete, or when a second phase retraining is complete (e.g., in response to query feedback as discussed in greater detail in FIG. 5), client system queries may be executed by query executor 232 using LLM 230.

In some embodiments, query executor 232 periodically runs one or more queries from query store 234, runs one or more queries received or selected in a query interface 236 (e.g., one demand from a human operator), or may run both types of queries. For example, in some embodiments a set of queries may be predefined and stored in query store 234. For example, the predefined queries can represent a set of queries deemed highly relevant to ongoing service system operation at the server computer system As another example, an operator may select a query from query store 234 or may define a new query via query interface 236, for example in response to an arising condition experienced at the server computer system 210 (e.g., an increase in incidence of fraud, a decrease in usage of a service system, etc.). In some embodiments, further query examples that may be predefined or generated on the fly by an operator include: "Which fraud appeals are most likely a good client system that is not fraudulent?"; "Prioritize fraud appeal users based on likelihood they are a good user"; "Does client system have fraudulent intent? If so, should we ask for information or shut them down?"; "Is client system misrepresenting information submitted during onboarding?". A benefit of using LLM 230 to answer these queries is that the LLM 230 can respond to such queries without having to be trained on the specific questions. This allows exploration of use of client system descriptor file representations since an LLM can reason a query response as a result of the first and second training phases discussed herein.

In some embodiments, the query may include retrieval augmented generation (RAG) queries. RAG is a query in which a set of descriptor files associated with a set of client systems are used to answer relative questions. For example, a RAG query might be "What client system is the top X in cohort Y?". Thus, RAG queries are queries about relation of client systems to other client system or groups of client systems. Thus, query executor 232, in response to a RAG query, may access one or more descriptor files from data store 222 for providing to LLM 230 to answer the query.

In some embodiments, based on results of a query, query executor 232 provides results to action generator 250. In some embodiments, queries may include a requested action, such as "Is fraud exhibited by client system sufficient to deny access to service X?". In such a query, the query result may be interpreted by action generator 250 as an instruction to configure a corresponding distributed service 204 (e.g., deny access to service X if a query result determines a client is exhibiting fraudulent behavior). That is, for example, access to a service may be denied to a client system based on a query result, a service offering may be reduced based on a query result, or some other remedial action taken to activate, change, or otherwise tune distributed operational characteristics of service systems 204.

In some embodiments, other queries may ask for quantitative results, such as "how likely is this client system to churn?" Based on a result value, action executor 240 may again actively configure operation of a service system, or alternatively, may generate a notification to a human operator of the server system 210 and/or an impacted client system (not shown). That is, action generator 250 may perform or cause to be performed one or more actions to remediate a condition detected as a result of the quer(ies) executed by query executor 232 based on the returned numerical value. In some embodiments, the numerical values returned by the queries may be interpreted by action generation based on one or more rules, heuristics, etc. that trigger when an action is taken in response to a query result.

In some embodiments, client system intelligence systems 212 therefore provide techniques for training and using an LLM to intelligently answer queries about the client systems that use the various services of a server computer system 210. The LLM, which is trained in multiple phases (e.g., a first unsupervised phase that enables the LLM to interpret natural language based queries, as well as other queries, and a second supervised phase that refines the LLM further for a domain in which the LLM is deployed) is able to use the collected and compressed signals in one or more client system descriptor files to answer various queries relevant to the provisioning of services to the client systems. Beneficially, the queries need not be structured in that the LLM is capable of responding to various text-based queries without a priori knowledge of the specific wording of a query.

Furthermore, the client system descriptor files, in some embodiments, are configured to reduce memory utilization for storage of such files. For example, signal values may be mapped or transformed to binned values to simplify and reduce the storage needs for each signal within the descriptor files. Additionally, and as discussed in greater detail below, the set of LLM input signals in the descriptor files may be reduced over time based on an analysis of the contribution of signals to query responses. That is, a descriptor file may contain X signals, but N of those are determined to contribute very little to query outcomes. Then, the descriptor file may be updated to include X-N total signals, where a reduced total number of signals leads to a reduced storage footprint of the descriptor files, and reduces computational load in collecting and compressing the reduced size descriptor files.

Therefore, the LLM 230 and the descriptor files defined and used for input to the LLM 230 enable intelligence to be determined for client systems in a straightforward way. Furthermore, embodiments enable reduced storage for the descriptor files, reduced computational load for generating and updating the descriptor files, and increased computational efficiency in LLM execution using simplified binned values for one or more signals.

Figure 4:
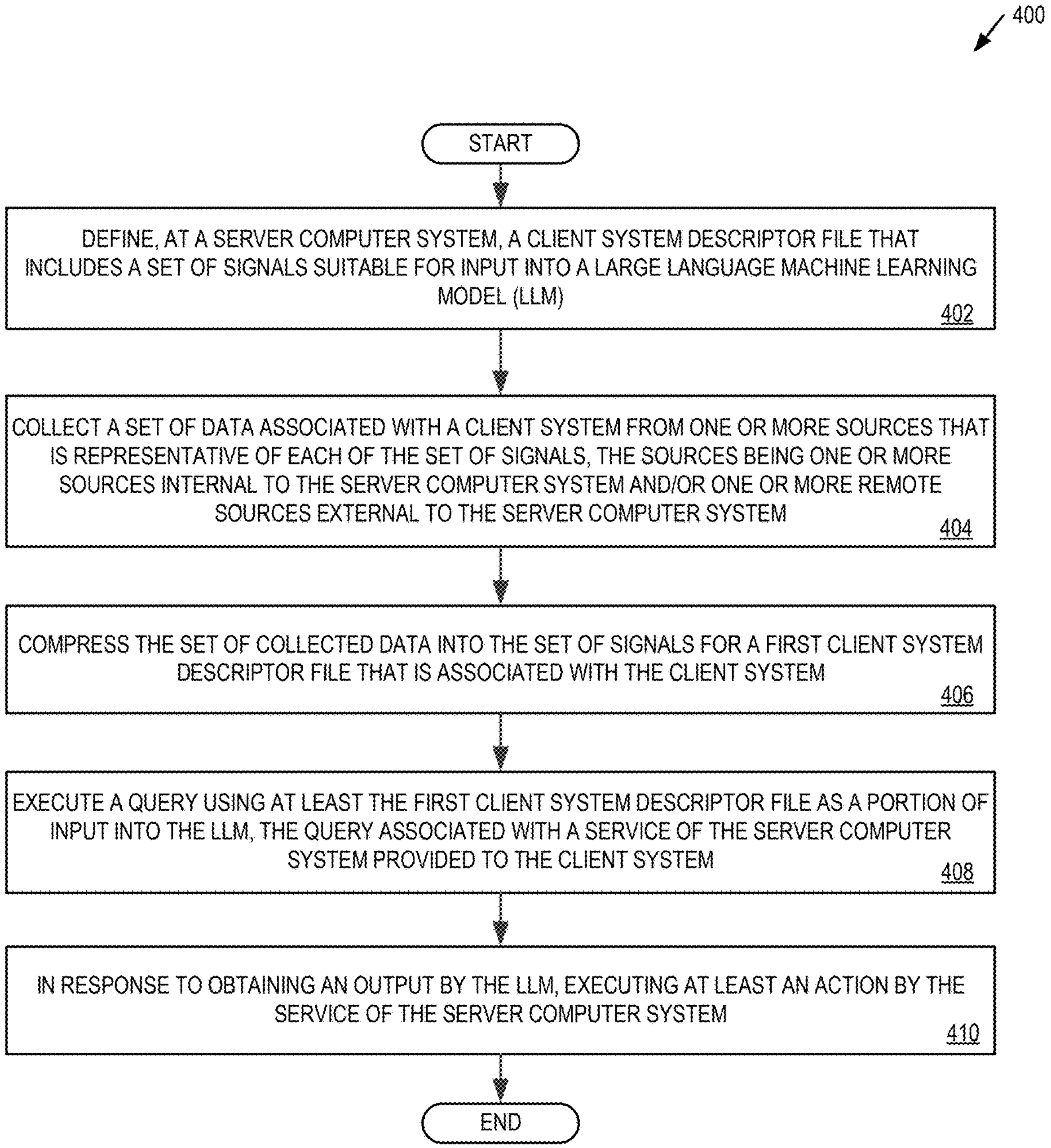
FIG. 4 is a flow diagram of one embodiment of a method for generating and using client system intelligence when executing a service of a server computer system.

FIG. 4 is a flow diagram of one embodiment of a method 400 for generating and using client system intelligence when executing a service of a server computer system. The method 400 is performed by processing logic that may comprise hardware (circuitry, dedicated logic, etc.), software (such as is run on a general purpose computer system or a dedicated machine), firmware, or a combination. In one embodiment, the method 400 is performed by a client system intelligence system of a server computer system that provides a plurality of distributed services to client systems (e.g., client system intelligence system 112 or 212 and server computer system 110 or 210).

Referring to FIG. 4, processing logic begins by defining, at a server computer system, a client system descriptor file that includes a set of signals suitable for input into a large language machine learning model (LLM) (processing block 402). The client system descriptor file, in some embodiments, is a structured data file, such as text, HTML, XML, or other data file, having a predefined structure and set of data. The set of data corresponds with a set of signals, and can include identification data for a client system associated with a descriptor file, as well as additional data such as the data that is representative of the signals for input into an LLM. Examples of signals discussed herein include identifiers of a client system, signals indicative of key users, signals indicative of service system usage, signals indicative of characteristic of the client system or usage, signals indicative of API events or a sequence of API events triggered by a client system, information extractable from remote sources (e.g., web page information, public domain database information, governmental database information, etc.), as well as many numerous forms of signals that may be used by an LLM for executing client system queries.

Processing logic then collects a set of data associated with a client system from one or more sources that is representative of each of the set of signals, the sources being one or more sources internal to the server computer system and/or one or more remote sources external to the server computer system (processing block 404). One or more collectors may obtain data from a local data store of a server computer system (e.g., a service system data store of data generated by the server computer system's execution of various services), obtain data from a remote data store (e.g., making queries to one or more publicly available databases, a client system web page, or other accessible data source), execute one or more machine learning model based queries or obtain machine learning model results (e.g., a count of fraud determinations by a fraud machine learning model, a web page summary from a LLM trained to generate web page summaries, etc.). In some embodiments, the collected set of data may also include multimodal data, such as higher order vectors or matrices (e.g., an X-dimensional vector or M×N dimensional matrix representing a machine learning model analysis of a client system's data and/or service system's operations). In this embodiment, the multimodal data may be generated and output by service systems during the course of operation of the service systems (e.g., a fraud detection service system may execute a fraud machine learning model to detect fraud during service request and stores a multimodal result that is accessible to processing logic), and the higher order vector or matrix can be joined to the other signal values of a descriptor file.

Processing logic compresses the set of collected data into the set of signals for a first client system descriptor file that is associated with the client system (processing block 406). Compressing the set of collected data includes processing logic transforming, through one or more of a function, a heuristic, a selection, a model output, a mapping, etc. as discussed herein, a collected corpus of collected client system data representative of the signals into consolidated signal values. An embodiment of content and formatting of a descriptor file is illustrated in FIG. 3A, as discussed in greater detail herein.

In some embodiments, a further compression of the consolidated signal values is performed by transforming the signal values to binned values. As discussed herein, the binned values are a transformation of a signal value to a discrete value that represents a range of the signal value (e.g., a signal representing a number of disputes against a client system may be binned as 0-1 disputes binned to the signal value 1, 2-1000 disputes binned to the signal value 2, and >1001 disputes binned to signal value 3). As discussed herein, at scale, using binned values greatly reduces storage requirements imposed by stored client system descriptor files, and further simplifies LLM analysis and training of the binned values (e.g., a reduced and discrete set of values) more computationally efficient.

Processing logic then executes a query using at least the first client system descriptor file as a portion of input into the LLM, the query associated with a service of the server computer system provided to the client system (processing block 408). In some embodiments, the client system descriptor file is configured as a structured data file, such as a text file, that can be input into a query prompt of an LLM. Additionally, one or more queries can be executed against the LLM based on the client system descriptor file, where the LLM generates an answer to the query. In some embodiments, the LLM generates the response including a chain of thought reasoning, as illustrated in FIG. 3B and discussed in greater detail herein.

In some embodiments, a query may include a RAG query that is based on analysis of a set of second client system descriptor files. As discussed above a RAG query is a query in which a set of descriptor files associated with a set of client systems are used to answer relative questions. For example, a RAG query might be "What client system is the top X in cohort Y?". Thus, RAG queries are queries about relation of client systems to other client systems or groups of client systems. In such RAG based queries, the set of descriptor files including the first descriptor file and the set of second descriptor files may all be fed to the LLM for answering the one or more RAG based queries.

In some embodiments, the descriptor file or set of descriptor files are cached as input to the LLM. Then, multiple queries can be executed against the LLM without having to re-access, and re-submit the client system descriptor file to the LLM. By caching the client system descriptor file input for the LLM, redundant data access operations and descriptor file LLM input operations can be avoided, which increases the efficiency of the LLM when executing multiple queries against the same descriptor file(s), such in an embodiment where multiple queries are executed as a group against the same descriptor file(s).

In response to obtaining an output by the LLM, processing logic further executes at least an action by the service of the server computer system (processing block 410). The action, as discussed herein in some embodiments, may be an alerting action in which an electronic message is transmitted to a server system user and/or client system user about the detected condition. The action, in other embodiments discussed herein, can be a remediation action that configures the operation of a service system based on a returned query results. For example, an operational characteristic of a service system can be adjusted based on a returned query result (e.g., increasing a fraud threshold of a fraud detection service system in response to detection that a client system is likely to exhibit behavior associated with fraud). The action, in further embodiments, can include generating a graphical user interface that displays the query results to an operator associated with the service system to which the query was directed. As discussed herein, the query itself can define the action, or an action generator (e.g., action generator 250 of FIG. 2) can interpret the query results, for triggering one or more of the actions discussed herein.

Prior to deployment of the LLM, or periodically to adapt the LLM to emerging client system or server system behaviors, the LLM is trained and/or retrained. FIG. 5 is a flow diagram of one embodiment of a method for training and retraining process used by a client system intelligence system of a server computer system. The method 500 is performed by processing logic that may comprise hardware (circuitry, dedicated logic, etc.), software (such as is run on a general purpose computer system or a dedicated machine), firmware, or a combination. In one embodiment, the method 500 is performed by a client system intelligence system of a server computer system that provides a plurality of distributed service to client systems (e.g., client system intelligence system 112 or 212 and server computer system 110 or 210).

Referring to FIG. 5, processing logic begins by performing a first training phase of a large language machine learning model (LLM) to learn language patterns, structures, and a domain of a server computer system for generating responses to queries, the first phase being a self-supervised training phase (processing block 502). In some embodiments, the first training phase is a regular LLM training phase that trains the LLM to recognize the relationships between words, so that a query can be interpreted by the LLM and an output (e.g., response) generated by the LLM. The first training phase is unsupervised and includes feeding the LLM with unannotated textual input to learn how to predict an appropriate output. In some embodiments, the processing logic may actively perform the first training phase. In other embodiments, processing logic may receive a trained LLM that has already undergone the first training phase.

In embodiment, so that the LLM can be successfully deployed within the domain of the server computer system (e.g., server computer system 110 or 210), processing logic further performs a second training phase of the LLM based on annotated training data supplied by the server computer to learn to answer queries related to the services of the server computer system based on a first set of signals defined by a first client system descriptor file, the second training phase being a supervised training phase (processing block 504). The second training phase is a supervised iterative training phase in which queries and expected responses are fed to the LLM so that the LLM learns how to respond to specific queries within the domain of a server computer system (e.g., 110 or 210). Furthermore, as discussed herein, the supervised training phase can include using compressed signal values (e.g., actual signal values, binned signal values, or a combination of value types) when training the LLM to answer specific questions using the specific input signal values and types.

Processing logic then receives an annotated set of training signals and/or associated query responses associated with queries executed against the LLM after the first and second training phase (processing block 506). In an embodiment, the annotated set of training signals received at processing block 506 represent feedback data obtained during execution of an LLM, such as deployment of an LLM after blocks 502 and 504. The feedback can include, for example, operator review of query responses and annotations to corresponding answers, client system requests to alter a remedial action take as a result of a query response, or a combination that alters the answer to a query. Such feedback that is used as retraining data enables the LLM to adapt over time to a current state of operation of a server computer system (e.g., emerging fraud patterns, evolving language choices during onboarding, addition of new service systems, etc.).

Processing logic further receives a second client system descriptor file defining a second set of signals, less than the first set of signals (processing block 508). In some embodiments, a signal quality can be determined for their contribution to query results. For example, a LLM can provide data indicative of how important a signal is in generating responses to one or more queries. In some embodiments, the LLM can be prompted for this information from an operator. The signal quality can indicate the contribution or weight a signal has on the responses to one or more queries. Thus, in some embodiments, the signals and/or quantity of signals used by the LLM can be finetuned. For example, signals that are not influential or do not contribute to query responses, can be removed from the client system descriptor files. Thus, over time, the number of signals in the descriptor files can be reduced to maintain LLM decision accuracy (e.g., since the eliminated signals do not contribute to decision outcomes), reduce storage requirements (e.g., by reducing the amount of data/signals stored in each descriptor file), reduce computational load of data collectors and LLM analysis (e.g., by reducing the number of signals for which data must be fetched by collectors, and input and analyzed by the LLM).

Processing logic then periodically initiates the second phase of LLM training to retrain the LLM based on the annotated set of training signals and/or associated query responses, the second set of signals defined by the second client system descriptor file, or combination thereof (processing block 510). The periodic training/retraining of the LLM via the second training phase refines the LLM over the first training phase, and further acts to refine the LLM over time. Such periodic refinement, based on feedback therefore improves model performance and enables the model to adapt to new behavior patterns, improving the LLM itself.

Figure 6:
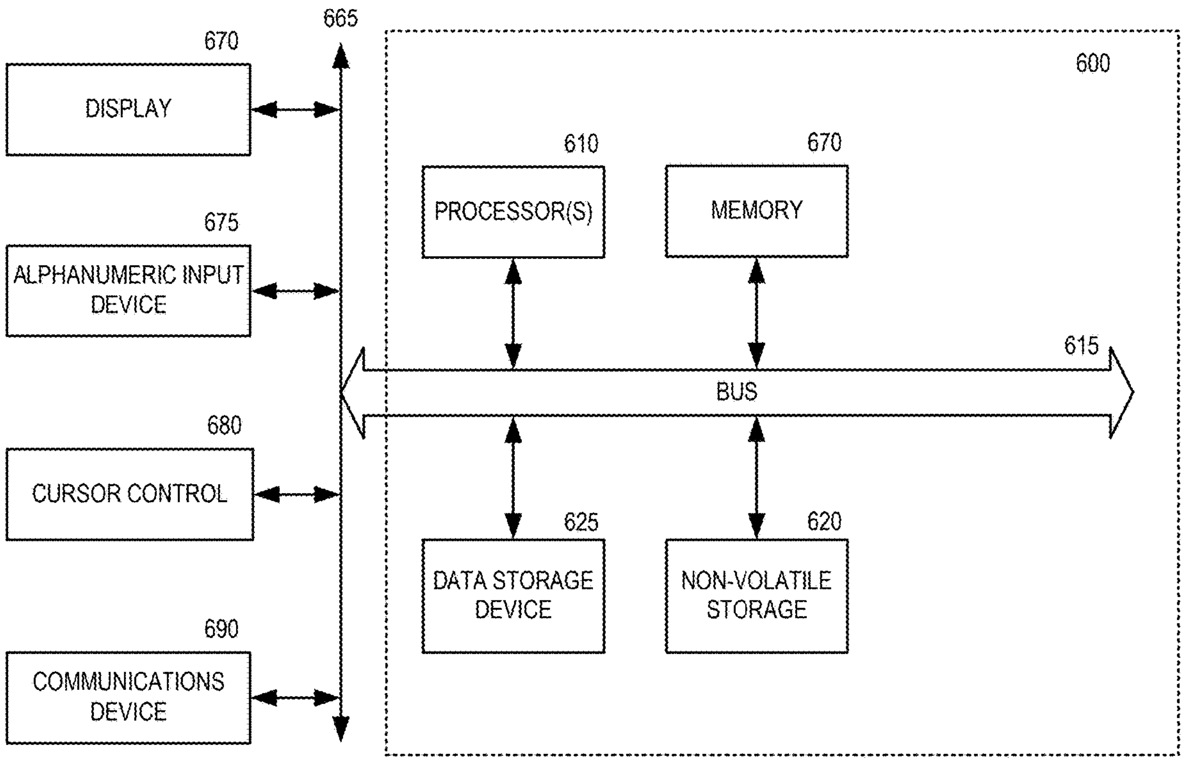
FIG. 6 is one embodiment of a computer system that may be used to support the systems and operations discussed herein.

FIG. 6 is one embodiment of a computer system that may be used to support the systems and operations discussed herein. For example, the computer system illustrated in FIG. 6 may be used by a server computer system, a client system, a third party system, etc. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 665, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for executing a service of a server computer system for a client system, comprising:

defining, at the server computer system, a client system descriptor file that includes a set of signals suitable for input into a large language machine learning model (LLM);

collecting, by the server computer system, a first set of data associated with a first client system from one or more source systems, wherein the first set of data is representative of the set of signals for the client system;

compressing, by the server computer system, the first set of data into the set of signals for a first client system descriptor file allocated for the client system;

executing, by the server computer system, a query using at least the first client system descriptor file as a portion of input into the LLM, the query associated with a service of the server computer system provided to the client system; and in response to obtaining an output by the LLM, executing at least an action by the service of the server computer system.

2. The method of claim 1, wherein the collecting further comprises:

accessing first data associated with the client system from a local data store of a server computer system;

querying one or more remote data stores for a second data associated with the client system; and wherein the first data and the second data comprise the first set of data.

3. The method of claim 1, wherein the collecting further comprises:

performing a second machine learning model analysis of a second set of data associated with the client system, wherein a result of the analysis comprises a higher order vector or matrix representing a second output of a second machine learning model;

joining the higher order vector or matrix to the first set of data prior to execution of the query.

4. The method of claim 1, wherein compressing the first set of data into the set of signals further comprises:

transforming, by the server computer system, one or more values of the first set of data into a binned value for a first signal in the set of signals.

5. The method of claim 1, wherein the query is a retrieval augmented generation (RAG) query, the server computer system accesses a set of second client system descriptor files, and wherein the set of second client system descriptor files forms another portion of the input into the LLM for execution of the query.

6. The method of claim 1, wherein the first client system descriptor file input into the LLM for execution of the query is cached, and wherein a second query is executed by the server computer system using the LLM using the cached input of the first client system descriptor file.

7. The method of claim 1, wherein executing at least the action by the service of the server computer system comprises:

adjusting an operational characteristic of the service system based on the output by the LLM;

generating and transmitting an alert message to an operator responsible for the service system;

generating a graphical user interface that displays the answer output by the LLM to an operator associated with the service system.

8. The method of claim 1, wherein prior to execution of the query by the LLM, the LLM is trained in a first unsupervised training phase to respond to natural language queries, and the method further comprises:

performing a second training phase of the LLM based on annotated training data supplied by the server computer, the second training phase being a supervised training phase using annotated data comprising query responses generated within an operational domain of the server computer system and training sets of signals corresponding to the client system descriptor file.

9. The method of claim 8, further comprising:

determining, by the server computer system, at least one of the set of signals in the client descriptor file that provides a contribution to a plurality of answers generated by the LLM below a minimum threshold value;

defining, at the server computer system, a new client system descriptor file that includes a new set of signals without the at least one of the set of signals, wherein a total number of signals in the new client system descriptor file is less than a total number of signals in the client system descriptor file; and initiating the second training phase of the LLM using the signal set defined by the new client system descriptor file.

10. The method of claim 8, wherein the second training phase is periodically performed to refine the LLM over time.

11. A non-transitory computer readable storage medium storing instructions, which when executed by a server computer system, causes the server computer system to perform operations for executing a service of the server computer system for a client system, the operations comprising:

defining, at the server computer system, a client system descriptor file that includes a set of signals suitable for input into a large language machine learning model (LLM);

collecting, by the server computer system, a first set of data associated with a first client system from one or more source systems, wherein the first set of data is representative of the set of signals for the client system;

compressing, by the server computer system, the first set of data into the set of signals for a first client system descriptor file allocated for the client system;

executing, by the server computer system, a query using at least the first client system descriptor file as a portion of input into the LLM, the query associated with a service of the server computer system provided to the client system; and in response to obtaining an output by the LLM, executing at least an action by the service of the server computer system.

12. The non-transitory computer readable storage medium of claim 11, wherein the operations for collecting further comprise:

performing a second machine learning model analysis of a second set of data associated with the client system, wherein a result of the analysis comprises a higher order vector or matrix representing a second output of a second machine learning model;

joining the higher order vector or matrix to the first set of data prior to execution of the query.

13. The non-transitory computer readable storage medium of claim 11, wherein the query is a retrieval augmented generation (RAG) query, the server computer system accesses a set of second client system descriptor files, and wherein the set of second client system descriptor files forms another portion of the input into the LLM for execution of the query.

14. The non-transitory computer readable storage medium of claim 11, wherein the first client system descriptor file input into the LLM for execution of the query is cached, and wherein a second query is executed by the server computer system using the LLM using the cached input of the first client system descriptor file.

15. The non-transitory computer readable storage medium of claim 11, wherein prior to execution of the query by the LLM, the LLM is trained in a first unsupervised training phase to respond to natural language queries, and the operations further comprise:

performing a second training phase of the LLM based on annotated training data supplied by the server computer, the second training phase being a supervised training phase using annotated data comprising: query responses generated within an operational domain of the server computer system and training sets of signals corresponding to the client system descriptor file.

16. A system for executing a service of a server computer system for a client system, the system comprising:

a memory; and one or more processors coupled with the memory configured to perform operations, comprising:

defining, at the server computer system, a client system descriptor file that includes a set of signals suitable for input into a large language machine learning model (LLM);

collecting, by the server computer system, a first set of data associated with a first client system from one or more source systems, wherein the first set of data is representative of the set of signals for the client system;

compressing, by the server computer system, the first set of data into the set of signals for a first client system descriptor file allocated for the client system;

executing, by the server computer system, a query using at least the first client system descriptor file as a portion of input into the LLM, the query associated with a service of the server computer system provided to the client system; and in response to obtaining an output by the LLM, execute at least an action by the service of the server computer system.

17. The system of claim 16, wherein the one or more processors are further configured to perform operations, comprising:

performing a second machine learning model analysis of a second set of data associated with the client system, wherein a result of the analysis comprises a higher order vector or matrix representing a second output of a second machine learning model;

joining the higher order vector or matrix to the first set of data prior to execution of the query.

18. The system of claim 16, wherein the query is a retrieval augmented generation (RAG) query, the server computer system accesses a set of second client system descriptor files, and wherein the set of second client system descriptor files forms another portion of the input into the LLM for execution of the query.

19. The system of claim 16, wherein the first client system descriptor file input into the LLM for execution of the query is cached, and wherein a second query is executed by the server computer system using the LLM using the cached input of the first client system descriptor file.

20. The system of claim 16, wherein prior to execution of the query by the LLM, the LLM is trained in a first unsupervised training phase to respond to natural language queries, and the one or more processors are further configured to perform operations, comprising:

performing a second training phase of the LLM based on annotated training data supplied by the server computer, the second training phase being a supervised training phase using annotated data comprising: query responses generated within an operational domain of the server computer system and training sets of signals corresponding to the client system descriptor file.

* * * * *